(12) United States Patent
Gillis et al.

(10) Patent No.: US 11,945,182 B2
(45) Date of Patent: Apr. 2, 2024

(54) ASSEMBLY FOR PLACEMENT OF SENSORS WITHIN TIRE

(71) Applicant: Compagnie Generale des Etablissements Michelin, Clermont-Ferrand (FR)

(72) Inventors: Christopher Gillis, Greenville, SC (US); Michael Hansana, Simpsonville, SC (US); Jonathan Kyle Justice, Simpsonville, SC (US); James Secord, Easley, SC (US); Alexandre Nadeau, Kentville (CA)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 217 days.

(21) Appl. No.: 17/609,853

(22) PCT Filed: Jun. 27, 2019

(86) PCT No.: PCT/US2019/039407
§ 371 (c)(1),
(2) Date: Nov. 9, 2021

(87) PCT Pub. No.: WO2020/263256
PCT Pub. Date: Dec. 30, 2020

(65) Prior Publication Data
US 2022/0219416 A1 Jul. 14, 2022

(51) Int. Cl.
*B29D 30/00* (2006.01)
*B29D 30/54* (2006.01)
(Continued)

(52) U.S. Cl.
CPC ......... *B29D 30/0061* (2013.01); *B29D 30/54* (2013.01); *B60C 25/005* (2013.01);
(Continued)

(58) Field of Classification Search
CPC .......... B60C 25/005; B29D 2030/0066; B29D 2030/0634; B29D 2030/549; B29D 2030/546; G01M 17/027
(Continued)

(56) References Cited

U.S. PATENT DOCUMENTS

| 2011/0102811 A1 | 5/2011 | Kaneko et al. |
| 2012/0134656 A1 * | 5/2012 | Mizukusa ........... G01M 17/027 |
| | | 396/19 |

(Continued)

FOREIGN PATENT DOCUMENTS

DE 102007056967 A1 5/2009

OTHER PUBLICATIONS

Wikipedia, "Linear actuator". <https://web.archive.org/web/20150218040130/https://en.wikipedia.org/wiki/Linear_actuator>. Accessed Aug. 8, 2023. (Year: 2015).*

(Continued)

*Primary Examiner* — Robert C Dye
*Assistant Examiner* — Alexander D Booth
(74) *Attorney, Agent, or Firm* — Neal P. Pierotti

(57) ABSTRACT

An assembly (10) for positioning sensors within a tire is provided that has first and second bead sensors (14,16), and first and second side-wall/shoulder sensors (18, 20). A first actuator (30) moves the sensors in a radial direction of the tire, and a second actuator (32) moves the first and second bead sensors in the axial direction of the tire. A third actuator (34) is present and moves the first and second bead sensors in the axial direction relative to the first and second sidewall/shoulder sensors. A fourth actuator (36) moves the first and second bead sensors in the axial direction relative to one another, and a fifth actuator (38) moves the first and second sidewall/shoulder sensors in the axial direction relative to one another.

12 Claims, 9 Drawing Sheets

(51) Int. Cl.
*B60C 25/00* (2006.01)
*G01M 17/02* (2006.01)

(52) U.S. Cl.
CPC .............. *B29D 2030/0066* (2013.01); *B29D 2030/0077* (2013.01); *B29D 2030/546* (2013.01); *G01M 17/02* (2013.01); *G01M 17/022* (2013.01)

(58) Field of Classification Search
USPC ........................................................ 73/146
See application file for complete search history.

(56) References Cited

U.S. PATENT DOCUMENTS

| | | | |
|---|---|---|---|
| 2014/0373614 A1* | 12/2014 | Steinbichler | G01M 17/027 73/146 |
| 2016/0231201 A1 | 8/2016 | Schober | |
| 2016/0349149 A1* | 12/2016 | Schober | G01M 5/0033 |
| 2017/0173907 A1 | 6/2017 | Kendall, Jr. | |
| 2017/0176175 A1 | 6/2017 | Lindsay | |
| 2018/0328819 A1 | 11/2018 | Boffa et al. | |
| 2020/0047569 A1 | 2/2020 | De Stasio et al. | |

OTHER PUBLICATIONS

Wikipedia, "Servomotor". <https://web.archive.org/web/20170219042717/https://en.wikipedia.org/wiki/Servomotor>. Accessed Aug. 8, 2023. (Year: 2017).*

European Patent Office, International Search Report and Written Opinion, dated Feb. 26, 2020, pp. 1-11 (included), European Patent Office, Rijswijk, The Netherlands.

* cited by examiner

ASSEMBLY FOR PLACEMENT OF SENSORS WITHIN TIRE

CROSS-REFERENCE TO RELATED APPLICATIONS

The present application is a 35 U.S.C. § 371 application of PCT/US19/39407 filed on Jun. 27, 2019 and entitled "Assembly for Placement of Sensors within Tire." PCT/US19/39407 is incorporated by reference herein in its entirety for all purposes.

FIELD OF THE INVENTION

The subject matter of the present invention relates to an assembly capable of inserting sensors into a tire to ascertain the condition of elements within the tire. More particularly, the present application involves an assembly that utilizes actuators and sensors for evaluating the structural integrity of the beads and shoulders of a tire during a tire retreading process.

BACKGROUND OF THE INVENTION

Commercial truck tires, such as heavy truck tires, are commonly retreaded after their tread wears to its end of life. Retreading is an economical process because the carcass of the tire can be preserved and reused while only the tread of the tire is replaced. However, certain structural elements of the carcass such as reinforcement cords or support elements may be damaged and require repair. Inspection of these elements is thus conducted during the retreading process to ascertain their condition. The damage or wear may be internal to the tire so sensors have been developed for detecting cord breaks or other damage to these internal elements that would not otherwise be ascertainable from a visual inspection of the tire.

The sensors are typically positioned inside of the tire during the inspection process, and this placement poses certain challenges. The profile and width can vary from tire to tire, and the size of the opening through which the sensors are placed can likewise vary between different tires. Also, the tires or sensors will need to be rotated during the inspection so that the entire 360 degree area of the tire is inspected. Further, multiple sensors that measure different areas of the tire may be utilized. It would be beneficial for efficiency to position all of these sensors simultaneously within the tire during the retread process. Although sensors for evaluating the structural integrity of tires are known, positioning multiple sensors at the sidewall/shoulder position and at the bead position at the same time is not known. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
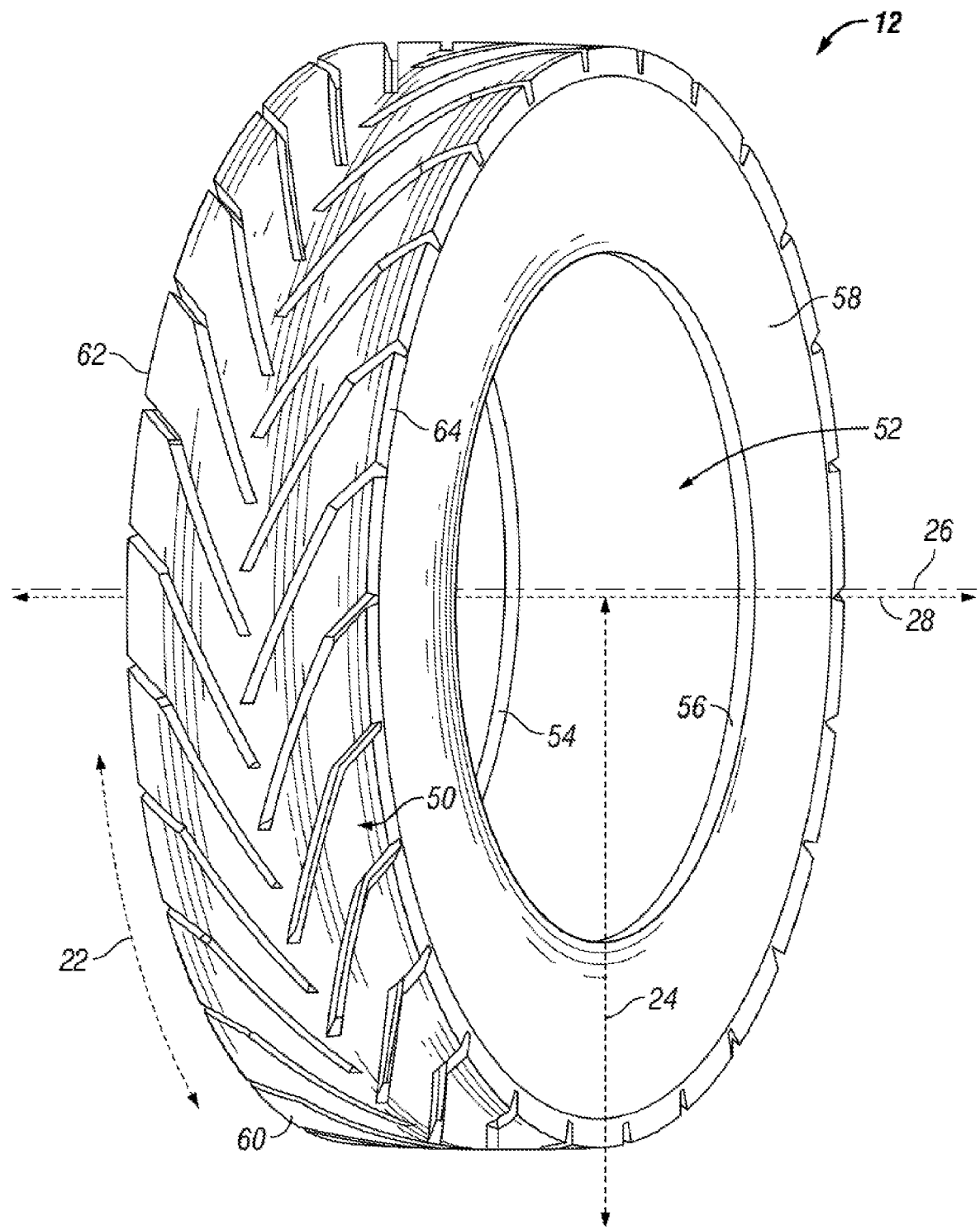
FIG. 1 is a perspective view of a tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an assembly 10 that can be used to check the condition of a tire 12 during a retreading process. The assembly 10 carries bead 14, 16 and sidewall/shoulder 18, 20 sensors. These sensors 14, 16, 18, 20 are moved into positions inside of the tire 12 by way of a series of actuators 30, 32, 34, 36, 38 that actuate to move the sensors in radial 24 and axial 28 directions. Once the sensors 14, 16, 18, 20 are properly positioned they can take readings of the tire 12 to determine its condition, and then the actuators 30, 32, 34, 36, 38 may actuate in reverse sequence in order to move the sensors 14, 16, 18, 20 out of the tire 12. The assembly 10 places the sidewall/shoulder sensors 18, 20, and the first and second bead sensors 14, 16 in the proper measurement locations in the tire 12 for sensing of the tire 12.

FIG. 1 shows a tire 12 that is a heavy duty truck tire 12. In this regard, the tire 12 is not designed for nor used with a car, motorcycle, or light truck (payload capacity less than 4,000 pounds), but is instead designed for and used with heavy duty trucks such as 18 wheelers, garbage trucks, or box trucks. The tire 12 may be a steer tire, a drive tire, a trailer tire, or an all position tire. The tire 12 includes a casing 58 onto which a tread 60 is disposed thereon. The tread 60 can be manufactured with the casing 58 and formed as a new tire 12, or the tread 60 can be a retread band that is attached to the casing 58 at some point after the casing 58 has already been used to form a retreaded tire 12. This is the case with all of the designs shown and described herein. They may all be tread designs of a brand new tire 12, or may be tread designs of a tread 60 for use in a retread tire 12. The central axis 26 of the tire 12 extends through the center of the casing 58, and the axial direction 28, which could be called the lateral direction 28, of the tire 12 is parallel to the central axis 26. The radial direction 24, referred to also as the thickness direction 24, of the tire 12 is perpendicular to the central axis 26 and the tread 60 is located farther from the central axis 26 in the thickness direction 24 than the casing 58. The tread 60 extends all the way around the casing 58 in the circumferential direction 22, also referred to as the longitudinal direction 22, of the tire 12 and circles the central axis 26 360 degrees. The tread 60 includes a series of grooves and ribs that form a tread pattern. A rolling tread width extends in the axial direction 28 from one shoulder tread edge 62 of the tread 60 to an opposite shoulder tread edge 64. The rolling tread width represents that portion of the tread 60 that engages the ground through normal operation of the tire 12, and the shoulder tread edges 62, 64 may engage the ground as well as the area between these locations in the axial direction 28.

The tread 60 can be part of a tire 12 or a retread band that is produced and subsequently attached to a casing 58 to form a retread tire 12. The same tread pattern can repeat throughout the entire longitudinal length of the tread 60 in the longitudinal direction 22. The surface of the tread 60 forms part of the exterior surface 50 of the tire 12. Additionally, a portion of the exterior surface 50 is formed by the exterior sections of the casing 58. The exterior surface 50 is the portion of the tire 12 that is visible when the tire 12 is mounted onto a wheel of a vehicle. The interior surface 52 of the tire 12 is that portion of the tire 12 that is not visible when the tire 12 is mounted onto the wheel of the vehicle. The interior surface 52 can be accessed through the opening of the casing 58 that is on either side of the tire 12 in the axial direction 28. The interior surface 52 is formed by the interior of the casing 58 both at the sidewalls of the casing 58 and at the crown portion onto which the tread 60 is positioned. The tread 60 pattern illustrated on the tire 12 in FIG. 1 is directional and includes grooves that extend from the shoulder tread edges 62, 64 and terminate at some point along the width of the tread 60. However, it is to be understood that the tread 60 pattern is but one example and can be variously configured in accordance with other embodiments.

The tire 12 includes a bead 54 and a bead 56 that seat onto the rim of the wheel and function to help hold the tire 12 onto the wheel. The boundaries between the exterior surface 50 and the interior surface 52 may be located at the beads 54, 56. The beads 54, 56 may become damaged through the life of the tire 12 and are inspected during a retread process to make sure they are in serviceable condition so that they can be used in the casing 58 that is retreaded. Likewise, belts and other elements in the casing 58 below the tread 60 are also inspected during the retread process to make sure they are in good shape for reuse in a retread tire 12. If these inspected elements are damaged they could be repaired before the retread tire 12 goes out onto the road, and if they are in too bad of shape and are not reparable then the casing 58 may have to be put out of service.

Figure 2:
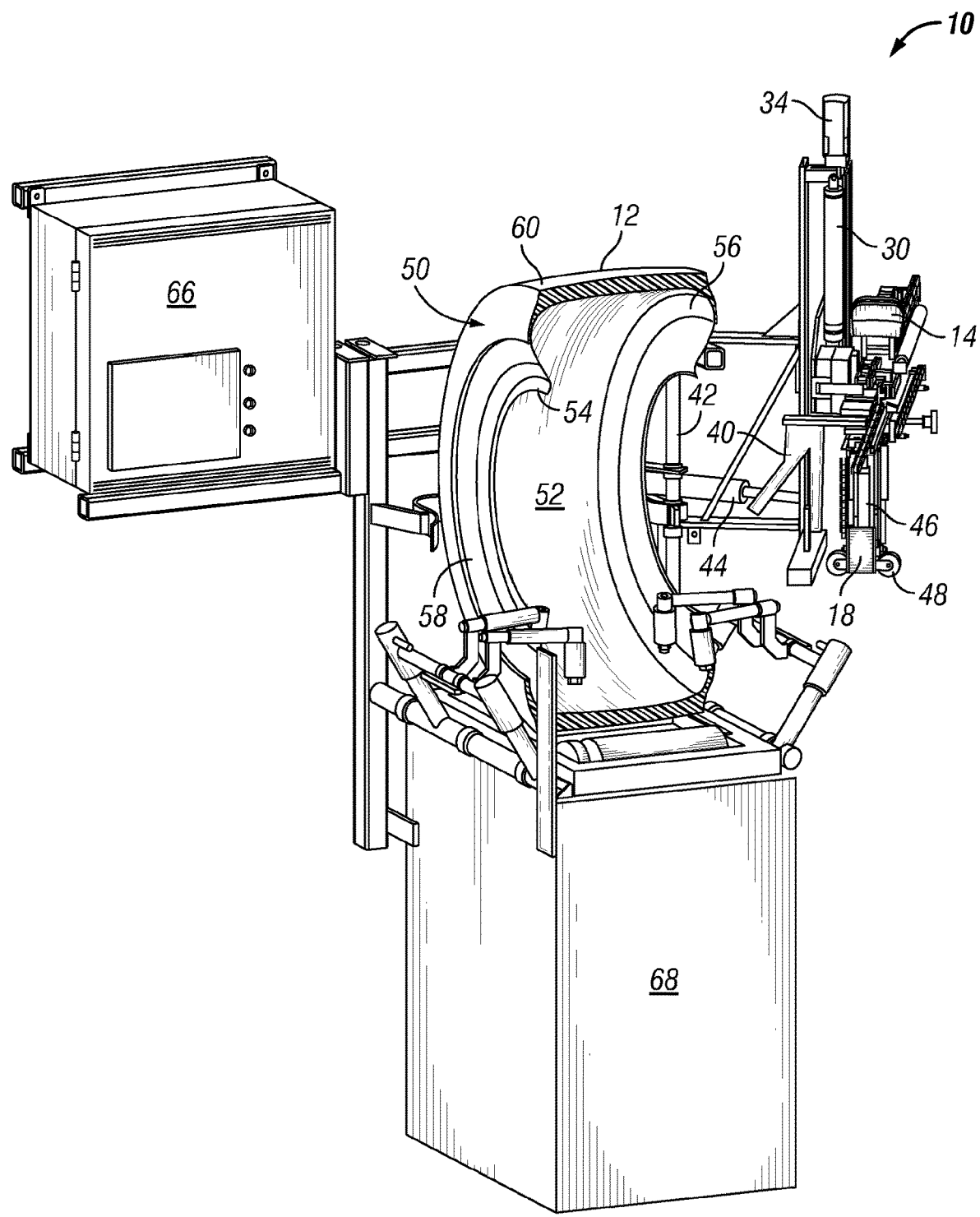
FIG. 2 is a perspective view of an assembly for sensing a tire in a home position.

FIG. 2 is a perspective view of the assembly 10 that is employed for positioning sensors 14, 16, 18, 20 into the tire 12 to inspect the beads 54, 56, belts, and other elements for damage when retreading. The tire 12 is positioned onto a base 68 that includes rollers and posts that help hold the tire 12 into an upright position. The tire 12 is cut away in the figures so that the interior surface 52 can be more easily seen and so that the interactions with the tire 12 and the assembly 10 can be more easily visualized. The assembly is composed of a series of actuators, sensors, and frame elements and can be positioned at a station adjacent to or even attached to the base 68. A control panel 66 is present and is in communication with the sensors, actuators, and other elements of the assembly 10 to control movements of the actuators and to provide feedback on the sensor readings. The control panel 66 could be located at or even attached to the base 68 or other elements of the assembly 10 and hardwired to these components, or may be a wireless control panel 66 that is located remotely from the base 68 and tire 12 and provides input to and receives output from various elements of the assembly 10.

The assembly 10 is illustrated in the home position and includes a frame 40 that carries the various actuators and sensors. The frame 40 is mounted to a post 42 in a pivoting connection and can swivel about the post 42. A frame actuator 44, which in one embodiment is a pneumatic cylinder, can be actuated to pivot the frame 40 and the various components it carries about the post 42. This pivoting can be clockwise or counterclockwise depending upon the direction of actuation of the frame actuator 44. In other embodiments, the frame 40 can be in pivoting engagement with the post 42, but a fame actuator 44 is not present. In these instances, an operator can manually push or pull the frame 40 to pivot it about the post 42.

Figure 3:
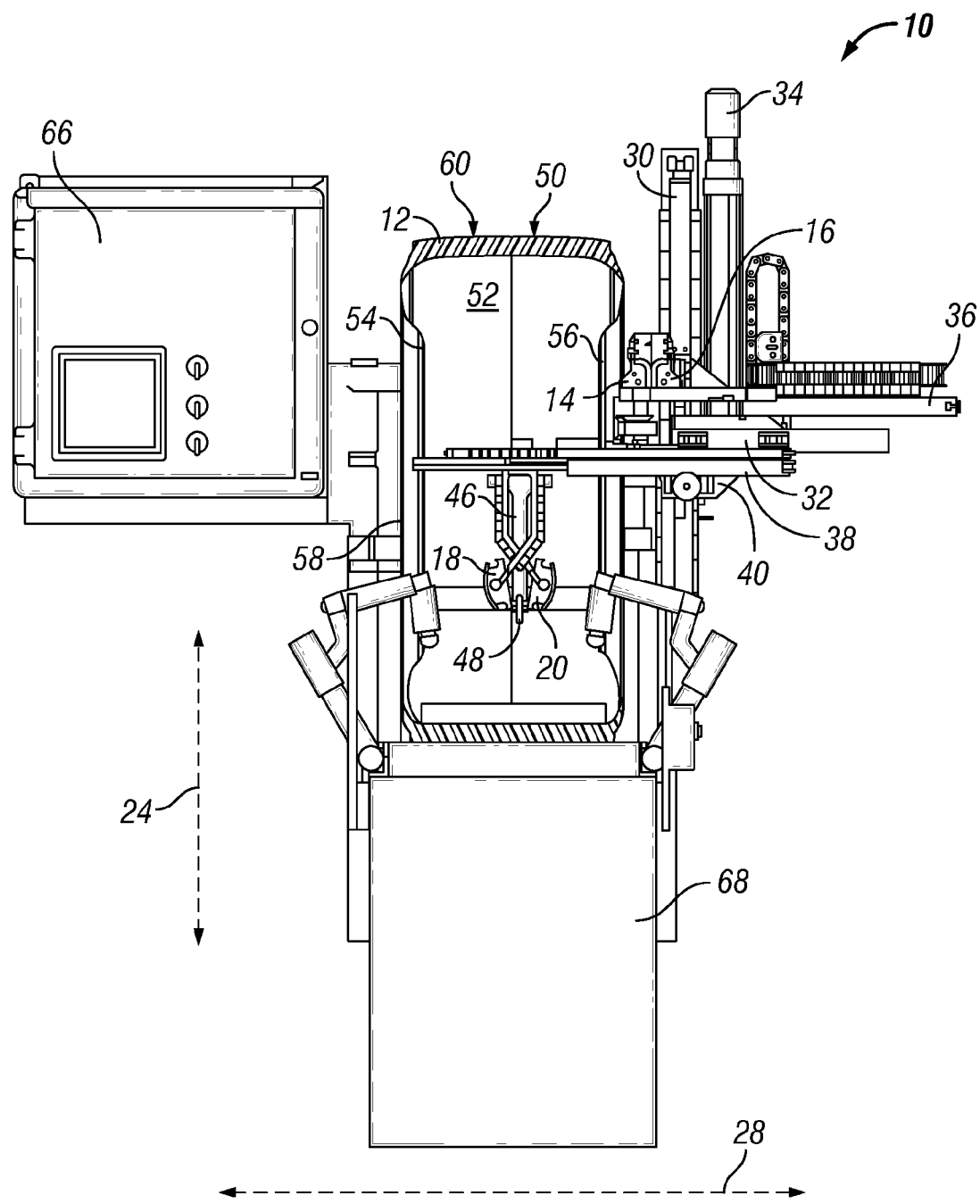
FIG. 3 is a front view of the assembly swung into position so that a portion of the assembly is inside of the tire.

With the assembly 10 in the home position, a tire 12 can be loaded onto the base 68 in an upright position so that it rests upon rollers that allow it to rotate about its central axis 26 while on the base 68. The tire 12 can be of any size and made for any type of vehicle, and in some embodiments may be heavy truck tires that can be used on 19.5-24.5 inch rim/wheel diameters. Rollers and other members may be present to help hold the tire 12 onto the base 68. In the home position all of the components of the assembly 10 are located outside of the tire 12 and none are in the interior of the tire 12. The frame actuator 44 can be actuated to rotate the frame 40 about post 42 so that the assembly 10 assumes the positioned illustrated in FIG. 3. A stop could be present up against which the frame 40 engages to properly position the assembly in FIG. 3, or the frame actuator 44 can be fully actuated to a known location of frame 40 and other components into the FIG. 3 position. In FIG. 3, the first and second sidewall/shoulder sensors 18, 20 are positioned inside of the tire 12, while other components of the assembly 10, such as the first and second bead sensors 14, 16, remain outside of the interior of the tire 12. The assembly 10 includes a wheel post 46 with wheels 48 on its end that are likewise inserted into the interior of the tire 12 upon rotation of the frame 40 about the post 42. The movement from the home position in FIG. 2 to the position shown in FIG. 3 where the sidewall/shoulder sensors 18, 20 are first inserted into the tire 12 is accomplished by rotational movement of the frame 40 and sensors 18, 20 so that movement in the axial direction 28 is made, but no movement in the radial direction 24.

Figure 4:
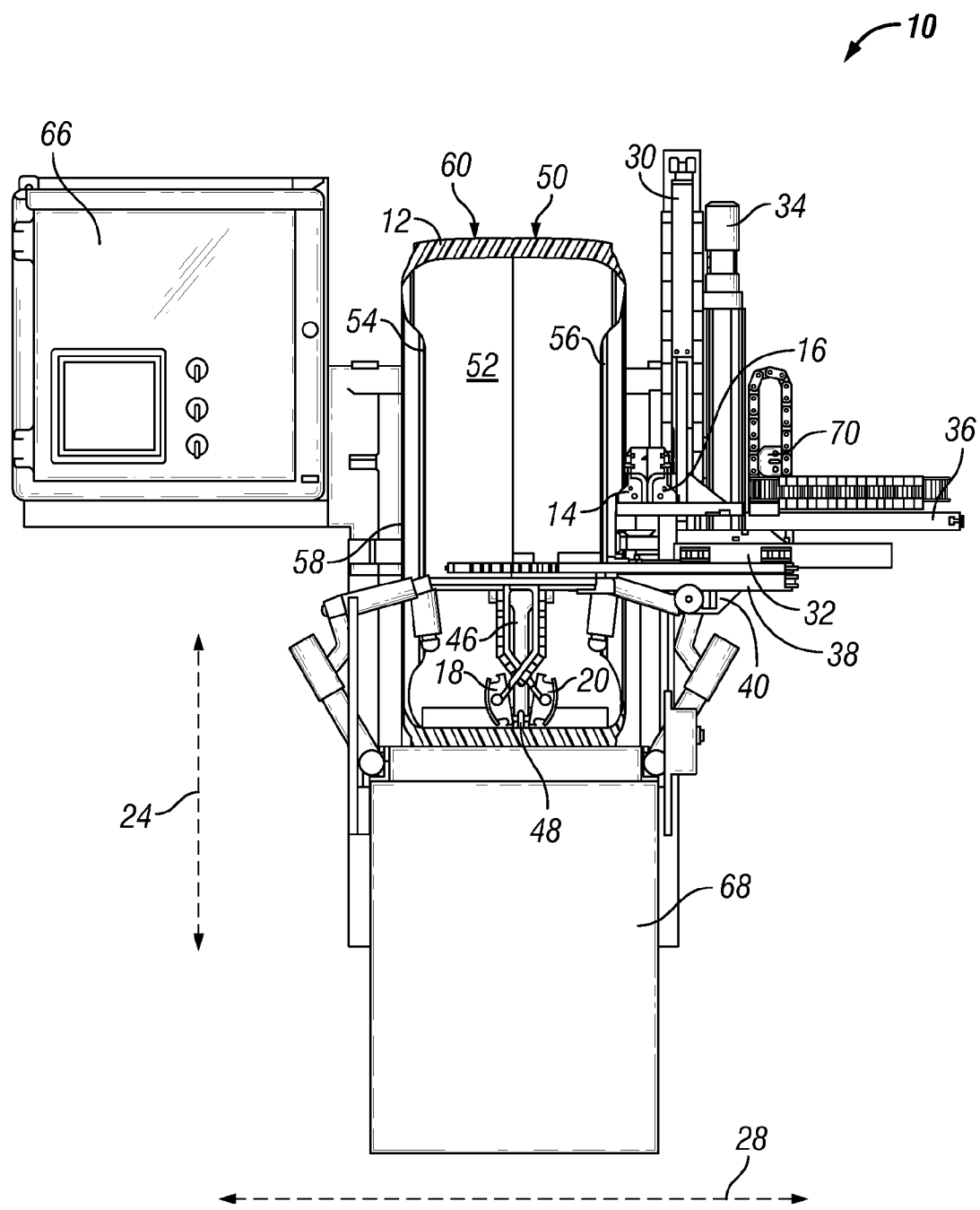
FIG. 4 is a front view of the assembly with the first actuator actuated so that the first and second sidewall/shoulder sensors are positioned closer to the inner surface of the tire.

The next step in the measurement process is the actuation of the first actuator 30 and is shown with reference to FIG. 4. The first actuator 30 may be a pneumatic cylinder carried by the frame 40 that pivots with the frame 40 when the frame 40 pivots about the post 42. The first actuator 30 is arranged on the frame 40 so that it actuates to extend in the radial direction 24 of the tire 12. Actuation of the first actuator 30 causes movement in the radial direction 24 of a significant number of components of the assembly 10. These components include the second through fifth actuators 32, 34, 36, 38, the wheel post 46 and wheels 48, and the sensors 14, 16, 18, 20, along with other portions of the frame 40 that support these components. The first actuator 30 actuates to move these components until the wheels 48 engage the interior surface 52 at which point the first actuator 30 stops to stop further movement of the various components in the radial direction 24. A sensor could be present to detect when the wheels 48 engage the interior surface 52, or the wheels 48 and wheel post 46 could be designed with some level of play so the first actuator 30 actuates to a level generally expected to engage the interior surface 52. Still further, the control panel 66 could be used by an operator to actuate the first actuator 30 until the operator sees the wheels 48 are in engagement with the interior surface 52 at which time the operator ceases actuation of the first actuator 30.

Figure 5:
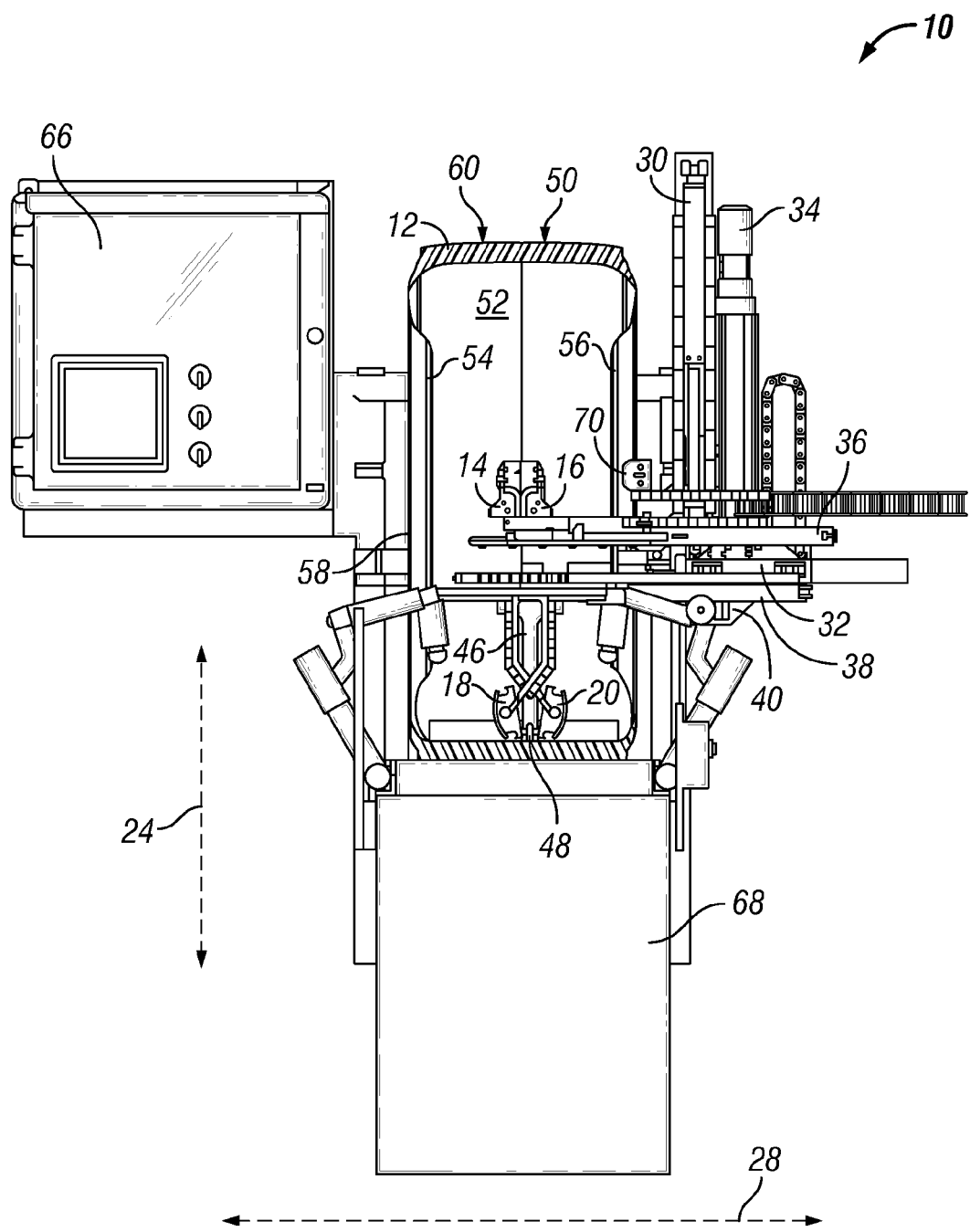
FIG. 5 is a front view of the assembly with the second actuator actuated so that the first and second bead sensors are positioned into the tire.

The next step in the positioning process involves actuation of the second actuator 32, which in the illustrated embodiment is a pneumatic slide. The assembly 10 is shown in this next step in FIG. 5 with the second actuator 32 actuated to cause the first and second bead sensors 14, 16, the fourth actuator 36, and some portions of the frame 40 supporting these elements to all move in the axial direction 28. The second actuator 32 does not move any of these components in the radial direction 24, but instead moves them only in the axial direction 28. Actuation of the second actuator 32 does not cause movement of the first and second sidewall/shoulder sensors 18, 20, the first actuator 30, the third actuator 34, or the fifth actuator 38. The first and second bead sensors 14, 16 are moved in the axial direction 28 until they are within the tire 12, and in some instances may be at the same axial position as the first and second sidewall/shoulder sensors 18, 20. The second actuator 32 may be sized and located so that it can fully extend and once doing so reaches the position shown in FIG. 5. In this position, a portion of the fourth actuator 36 may be within the interior of the tire 12 while a portion of it is outside of the interior of the tire 12. Alternatively, in the position shown in FIG. 5, the entire fourth actuator 36 could be outside of the interior of the tire 12.

Figure 6:
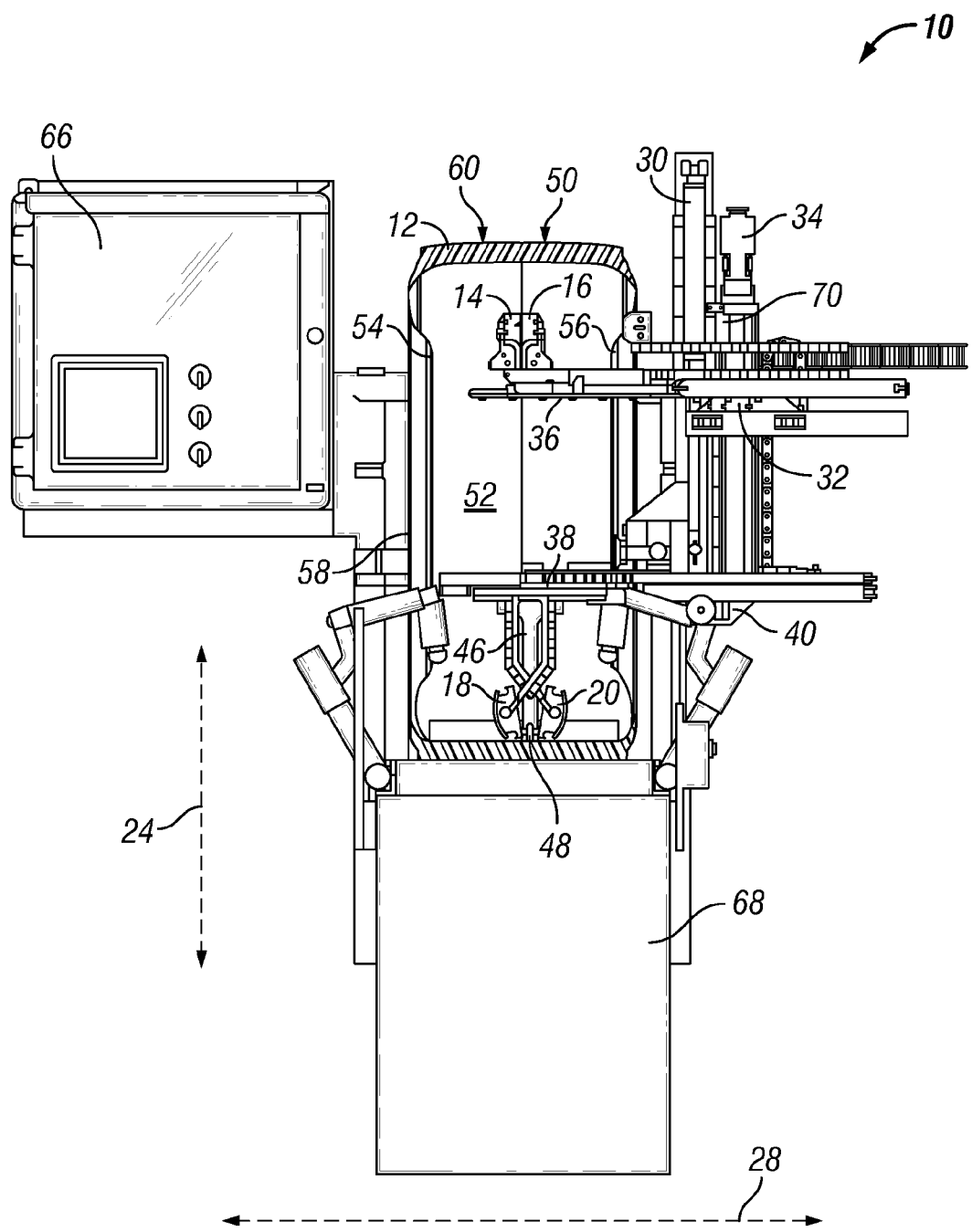
FIG. 6 is a front view of the assembly with the third actuator actuated so that the first bead sensor and the second bead sensor are moved in the radial direction and closer to the inner surface of the tire.

The next movement of the assembly 10 involves the actuation of the third actuator 34, which in the illustrated embodiment is a servomotor and this next step is shown in FIG. 6. The third actuator 34 may be an electric servo drive/lift, or could be any type of actuator capable of linear movement. The third actuator 34 moves the first and second bead sensors 14, 16 and the second and fourth actuator 32, 36 and associated frame 40 supporting elements in the radial direction 24 but not in the axial direction 28. This movement in the radial direction 24 is 180 degrees opposite to the previously described radial direction 24 movement of the first actuator 30. The third actuator 34 does not move the sensors 18, 20, wheels 48, wheel post 46, or actuators 30, 38. The frame 40 components that are moved upward/outward in the radial direction 24 by the third actuator 34 carry a light sensor 70 that is likewise moved upon actuation of the third actuator 34, and upon reaching a particular point determines that the bead sensors 14, 16 have been properly positioned. The light sensor 70 could be in communication with the control panel 66 and once the light sensor 70 informs the control panel 66 that the bead sensors 14, 16 are moved into the desired spot, the actuation of the third actuator 34 can cease to stop further movement of the bead sensors 14, 16. Alternatively, any other mechanism of stopping the third actuator 34 could be employed, and likewise light sensors 70 could be used in association with the other actuators 30, 32, 36, 38, 44 to indicate that it is time to stop their movement. The first and second bead sensors 14, 16 are moved in the radial direction 24 until they are at the same radial location as the beads 54, 56 in the radial direction 24, although they are at the midpoint of the beads 54, 56 in the axial direction 28.

The next step in the positioning process is illustrated with reference to FIG. 7 in which both the fourth actuator 36 and the fifth actuator 38 are actuated. The fourth actuator 36 may be a pneumatic cylinder, and actuation of the fourth actuator 36 causes the first bead sensor 14 and the second bead sensor 16 to move away from one another in the axial direction 28. The fourth actuator 36 actuates and moves only in the axial direction 28, and not the radial direction 24, and a linkage translates this axial motion to the first and second bead sensors 14, 16. The linkage is arranged so that both of the bead sensors 14, 16 move relative to the tire 12 in that the first bead sensor 14 moves toward the bead 54, and the second bead sensor 16 moves toward the bead 56 in the axial direction 28. It is thus the case in the disclosed arrangement that both bead sensors 14, 16 move relative to the tire 12 in the axial direction 28, and not the case that only one of the bead sensors 14 or 16 moves relative to the tire 12 in the axial direction 28 while the other bead sensor 14 or 16 remains stationary relative to the tire 12 in the axial direction 28. The fourth actuator 36 actuates to put the first bead sensor 14 into engagement with the bead 54, and the second bead sensor 16 into engagement with the bead 56 on the interior surface 52. In other arrangements, the bead sensors 14, 16 are not moved into engagement with the beads 54, 56 but instead are moved only into close proximity to the beads 54, 56.

The first and second sidewal/shoulder sensors 18, 20 are initially in a scissor configuration with one another so that portions of one sensor 18 are located on opposite sides of other portions of the other sensor 20. The fifth actuator 38 actuates to cause the first sidewall/shoulder sensor 18 and the second sidewall/shoulder sensor 20 to move away from one another in the axial direction 28. The sensors 18, 20 both move relative to the tire 12 in the axial direction 28, and it is not the case that the sensors 18, 20 in the illustrated embodiment are arranged so that one remains stationary relative to the tire 12 in the axial direction 28 while the other one moves relative to the tire 12 in the axial direction 28. The fifth actuator 38 can be a pneumatic cylinder and upon actuation extends only in the axial direction 28 and not the radial direction 24. A linkage connects the end of the piston rod of the fifth actuator 38 to the pair of sensors 18, 20 and translates the one directional linear motion of the piston rod to the sensors 18, 20 so that they move opposite to one another in the axial direction 28. The sensors 18, 20 are moved out of their initial, scissor orientation so that the first sidewall/shoulder sensor 18 moves in the same direction as the rod of the fifth actuator 38 and engages the interior surface 52 of the sidewall and shoulder of the tire 12. The second sidewall/shoulder sensor 20 moves in an opposite direction to the first sidewall/shoulder sensor 18 in the axial direction 18, and thus opposite to the direction of extension of the rod of the fifth actuator 38. The second sidewall/shoulder sensor 20 moves into engagement with the interior surface 52 at the sidewall and shoulder of the tire 12. In some embodiments the first and second sidewall/shoulder sensors 18, 20 do not engage the interior surface 52 upon actuation of the fifth actuator 38, but instead are moved into proximity to the interior surface 52 at the sidewall and shoulder and not in engagement with the interior surface 52.

Although described as actuating simultaneously, it may be the case that the fourth actuator 36 actuates before or after the fifth actuator 38. In some instances, the fourth and fifth actuators 36, 38 may be on the same pneumatic line as one another and when fluid pressure is applied therethough they both actuate at the same time, or one actuates before the other based upon the sizes and resistances of the actuators 36, 38 as the pneumatic fluid will function to actuate one before the other even when simultaneously applied to both on the same line.

Figure 7:
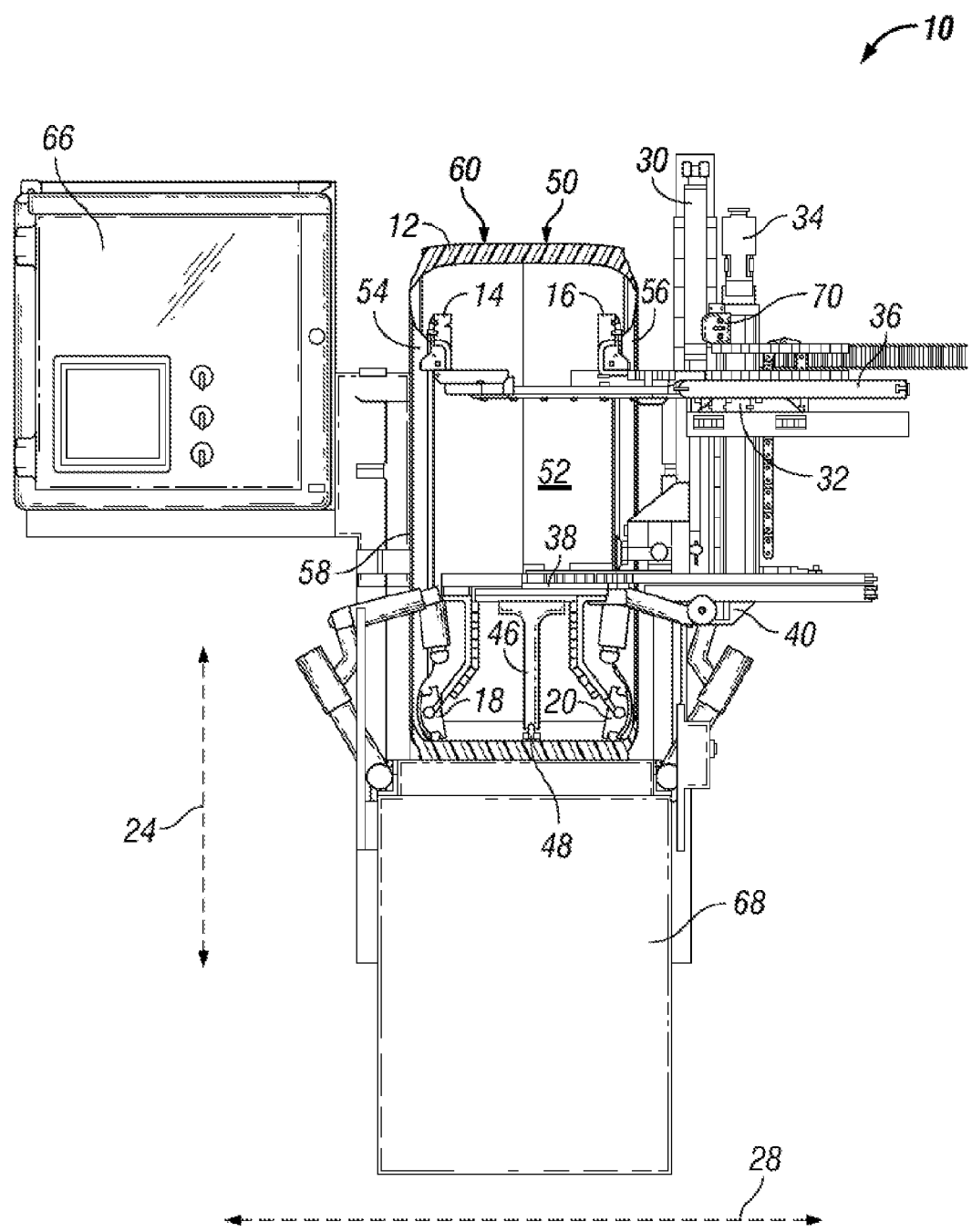
FIG. 7 is a front view of the assembly with the fourth and fifth actuators actuated so that the bead and sidewall/shoulder sensors are moved into position against to proximate to the tire.

Once the assembly 10 is in the orientation illustrated in FIG. 7, the sensors 14, 16, 18, 20 can be activated to begin sensing the tire 12 at the beads 54, 56, and sidewall/shoulder areas to determine if there is damage to these regions. This data can be communicated from the sensors 14, 16, 18, 20 to the control panel 66. The tire 12 may rest upon rollers of the base 68 and the tire 12 may be rotated about its central axis 26 in order to rotate the tire 12 360 degrees. The wheels 48 also engage the interior surface 52 and can stabilize the tire 12 upon rotation. As the tire 12 rotates about the sensors 14, 16, 18 and 20 readings are taken so that the entire beads 54, 56 and sidewall/shoulders are sensed along the entire longitudinal/circumferential direction 22 of the tire 12. To rotate the tire 12, an operator may manually spin the tire 12 about its central axis 26. Alternatively, a wheel or roller of the base 68 in engagement with the tire 12 can rotate and this rotation can be imparted onto the tire 12 to cause it to likewise rotate about the central axis 26. Additionally or alternatively, the wheels 48 could be driven by a motor to turn and this rotation could be imparted on the interior surface 52 to drive the tire 12 to rotate about its central axis 26.

Figure 8:
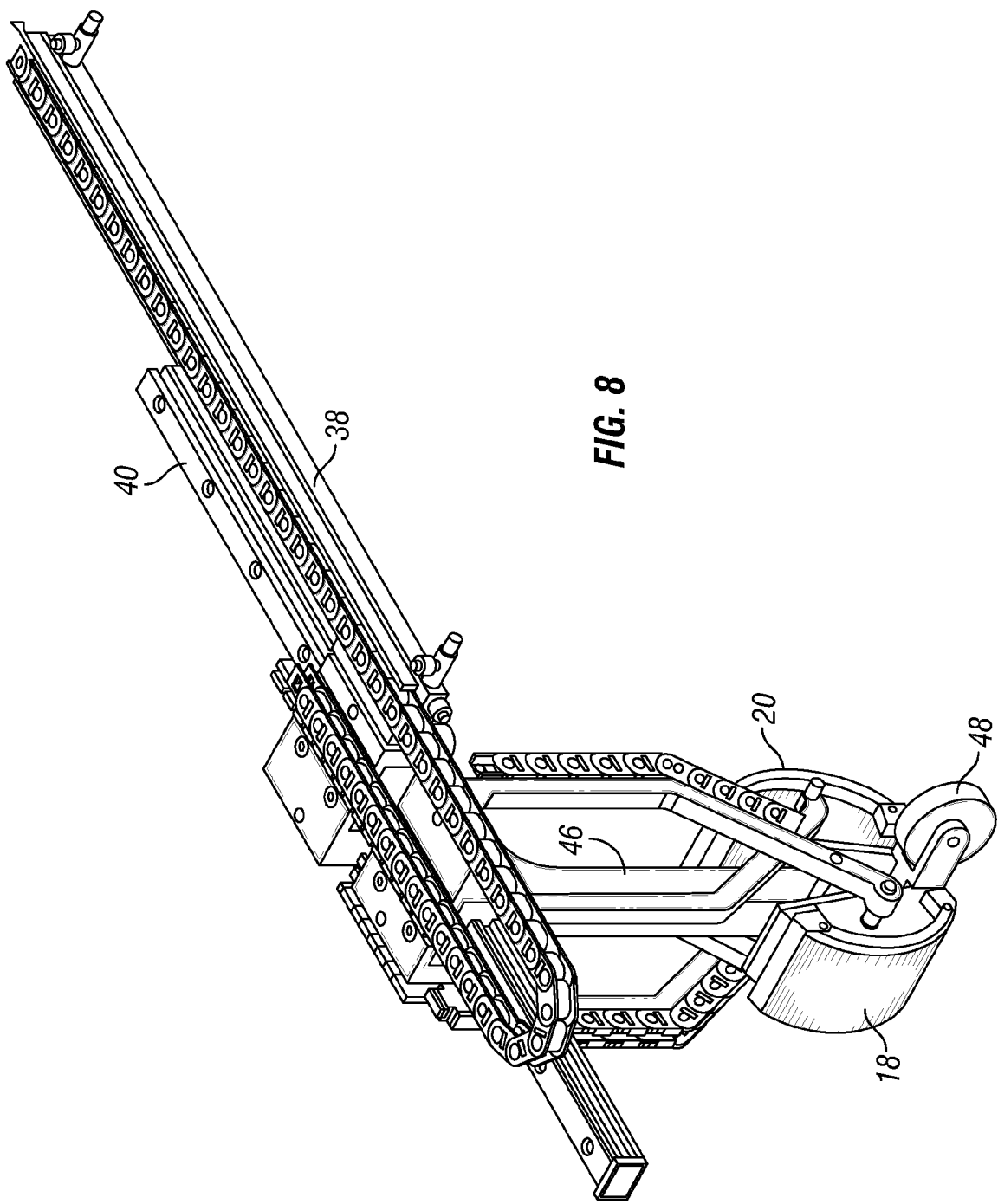
FIG. 8 is a perspective view of the sidewall/shoulder sensors and the fifth actuator in an unactuated position.

FIG. 8 is a perspective view of the fifth actuator 38 in an unactuated state along with the portion of the frame 40 that carries the wheel post 46, wheels 48, first sidewall/shoulder sensor 18, and second sidewall/shoulder sensor 20. The sensors 18, 20 are nested with one another into a scissor configuration such that their posts cross and engage the linkage attached to the rod of the fifth actuator 38. A design similar to that disclosed for positioning the first and second sidewall/shoulder sensors 18, 20 is presented in U.S. Pat. No. 9,927,326 entitled "Device for Sensor Placement Within a Tire for Repeated Sensor Insertion and Withdrawal", issued Mar. 27, 2018 the entire contents of which are incorporated by reference herein in their entirety for all purposes. The wheel post 46 and wheels 48 are located between the first and second sidewall/shoulder sensors 18, 20 in the axial direction 28 when the fifth actuator 38 is not actuated. The configuration of the portion of the assembly 10 in FIG. 8 may be the same as that previously described with reference to FIGS. 3-6 when the fifth actuator 38 is not actuated.

Figure 9:
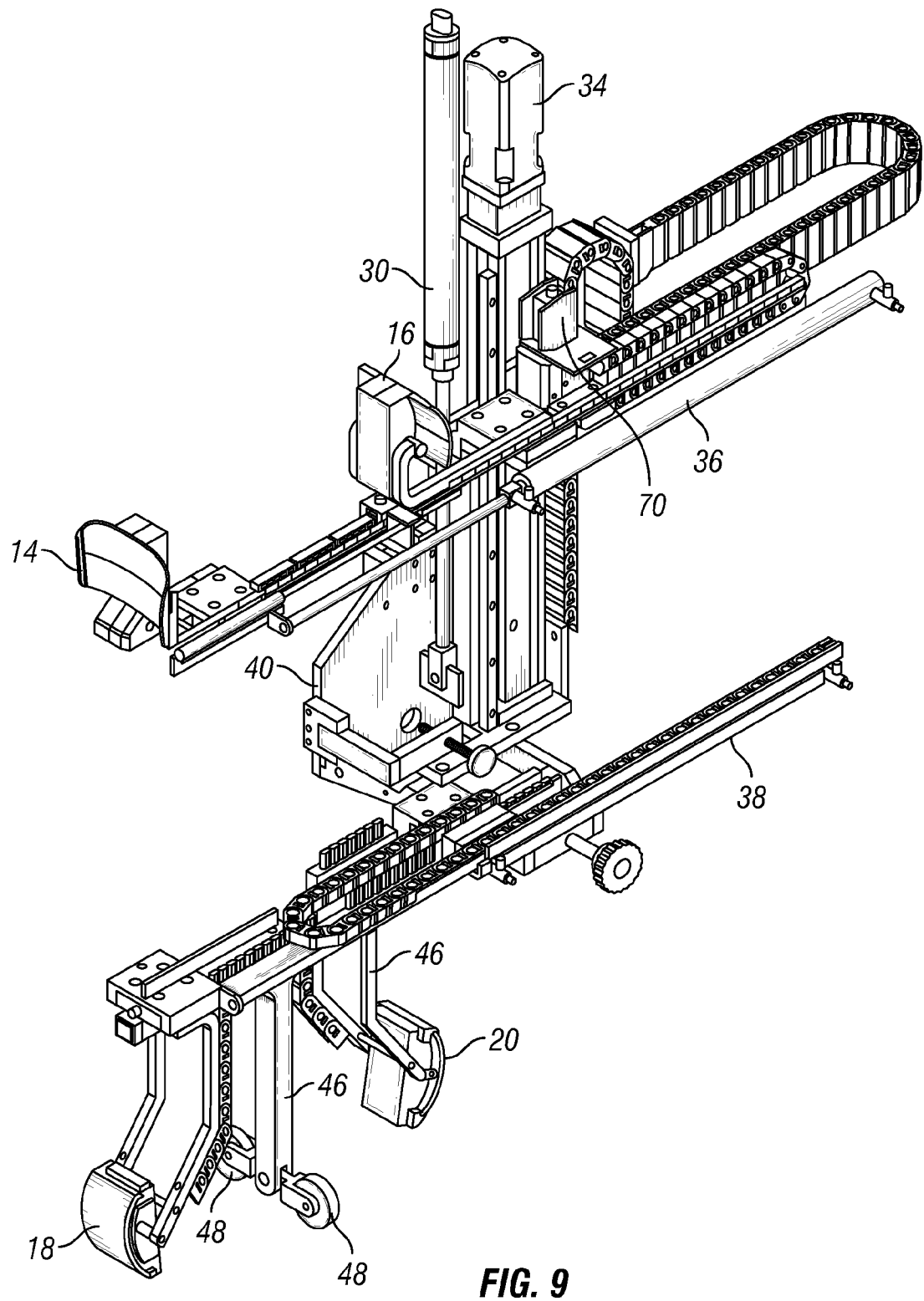
FIG. 9 is a perspective view of various actuators and associated components in the actuated positions.

FIG. 9 is a perspective view of that shows the first actuator 30, third actuator 34, fourth actuator 36, and fifth actuator 38 and associated frame 40 elements that carry these components. The various actuators 30, 34, 36, 38 are in the actuated positions and the sensors 14, 16, 18 and 20 are likewise in the actuated positions they would be in when measuring the tire 12 and as previously described when discussing the FIG. 7 orientation of the assembly 10.

Once the readings from the sensors 14, 16, 18, 20 have been taken and the tire 12 has been measured, the assembly 10 is then returned to the home position in FIG. 2, and a subsequent tire 12 can be loaded onto the base 68 for measurement. In order to return the assembly 10 to the home position, the previously described order of steps can be executed in reverse order. First, the fourth and fifth actuators 36, 38 can be actuated to cause them to move in the axial direction 28 to return the sensors 14, 16, 18, 20 to the retracted positions shown with reference to FIG. 6. Next, the third actuator 34 is actuated to move the fourth actuator 36 and other components into the FIG. 5 orientation. Subsequently, The first and second bead sensors 14, 16 are moved in the axial direction 28 outside of the interior of the tire 12 via actuation of the second actuator 32 to put the assembly 10 into the position shown in FIG. 4. The first actuator 30 is then actuated and the first and second sidewall/shoulder sensors 18, 20 are moved in the radial direction 24 to be able to clear the sidewalls of the casing 58. From here, the assembly 10 is swung or otherwise moved completely out of the interior of the tire 12 to the home position shown in FIG. 2 by an operator, or by actuating the frame actuator 44.

The various actuators 30, 32, 34, 36, 38, 44 can be any mechanism capable of moving another components. The actuators could be linear actuators in that the movement they effect is only in the linear direction. Examples of actuators that may be incorporated into the assembly 10 include but are not limited to pneumatic cylinders, pneumatic slides, and servomotors.

The first and second sidewall/shoulder sensors 18, 20 have been described as sensing a portion of the tire 12 that includes the sidewall and the shoulder. However, the sidewall/shoulder sensors 18, 20 as used herein may check for damage and thus sense only the sidewall of the tire 12 and not the shoulder of the tire 12. Alternatively, the sidewall/shoulder sensors 18, 20 may check for damage and thus sense only the shoulder of the tire 12 and not the sidewall of the tire 12. Still further the sidewall/shoulder sensors 18, 20 may check both the sidewall and the shoulder of the tire 12. One of the sensors 18 could check the sidewall and/or the shoulder, and the other sensor 20 could check the sidewall and/or the shoulder in various embodiments. Any type of sidewall/shoulder sensors 18, 20 could be employed. For example, the sidewall/shoulder sensors shown and described in patent publication number WO 2010/117855 entitled "Tire Metallic Cable Anomaly Detection Method and Apparatus" which published on Oct. 14, 2010 can be used, and the contents of this patent publication are incorporated by reference herein in their entirety for all purposes. Likewise, any type of bead sensors 14, 16 could be used in the assembly 10. The sensors 14, 16, 18, 20 employed may detect deterioration or damaged cables/wire in the tire 12. The sensors 14, 16, 18, 20 could detect damage or deterioration of other components of the tire 12, but in some exemplary embodiments only detect cable or wire damage or deterioration.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An assembly for positioning sensors within a tire, comprising:
    a first bead sensor;
    a second bead sensor;
    a first sidewall/shoulder sensor;
    a second sidewall/shoulder sensor;
    a first actuator that moves the first bead sensor, the second bead sensor, the first sidewall/shoulder sensor, and the second sidewall/shoulder sensor in a radial direction of the tire;
    a second actuator that moves the first bead sensor and the second bead sensor in an axial direction of the tire such that the first bead sensor and the second bead sensor move in the axial direction relative to the first sidewall/shoulder sensor and the second sidewall/shoulder sensor;

a third actuator that moves the first bead sensor and the second bead sensor in the radial direction such that the first bead sensor and the second bead sensor move in the radial direction relative to the first sidewall/shoulder sensor and the second sidewall/shoulder sensor;

a fourth actuator that moves the first bead sensor and the second bead sensor in the axial direction relative to one another; and a fifth actuator that moves the first sidewall/shoulder sensor and the second sidewall/shoulder sensor in the axial direction relative to one another;

a frame that carries the first bead sensor, the second bead sensor, the first sidewall/shoulder sensor, the second sidewall/shoulder sensor, the first actuator, the second actuator, the third actuator, the fourth actuator, and the fifth actuator;

a post onto which the frame is pivotally mounted;

a frame actuator that is a pneumatic cylinder that urges the frame to pivot about the post such that the first bead sensor, the second bead sensor, the first sidewall/shoulder sensor, the second sidewall/shoulder sensor, the first actuator, the second actuator, the third actuator, the fourth actuator, and the fifth actuator pivot about the post.

2. The assembly as set forth in claim 1, wherein the first actuator moves the second actuator, the third actuator, the fourth actuator, and the fifth actuator in the radial direction.

3. The assembly as set forth in claim 1, wherein the first actuator is a pneumatic cylinder.

4. The assembly as set forth in claim 1, wherein the second actuator moves the fourth actuator in the axial direction.

5. The assembly as set forth in claim 1, wherein the second actuator is a pneumatic slide.

6. The assembly as set forth in claim 1, wherein the third actuator moves the second actuator and the fourth actuator in the radial direction.

7. The assembly as set forth in claim 1, wherein the third actuator is a servomotor.

8. The assembly as set forth in claim 1, wherein the fourth actuator simultaneously moves the first bead sensor and the second bead sensor in the axial direction such that the first bead sensor and the second bead sensor are moved relative to one another in the axial direction.

9. The assembly as set forth in claim 8, wherein the fourth actuator is a pneumatic cylinder.

10. The assembly as set forth in claim 1, wherein the fifth actuator simultaneously moves the first sidewall/shoulder sensor and the second sidewall/shoulder sensor in the axial direction such that the first sidewall/shoulder sensor and the second sidewall/shoulder sensor are moved relative to one another in the axial direction.

11. An assembly for positioning sensors within a tire, comprising:

a first bead sensor;

a second bead sensor;

a first sidewall/shoulder sensor;

a second sidewall/shoulder sensor;

a first actuator that moves the first bead sensor, the second bead sensor, the first sidewall/shoulder sensor, and the second sidewall/shoulder sensor in a radial direction of the tire;

a second actuator that moves the first bead sensor and the second bead sensor in an axial direction of the tire such that the first bead sensor and the second bead sensor move in the axial direction relative to the first sidewall/shoulder sensor and the second sidewall/shoulder sensor;

a third actuator that moves the first bead sensor and the second bead sensor in the radial direction such that the first bead sensor and the second bead sensor move in the radial direction relative to the first sidewall/shoulder sensor and the second sidewall/shoulder sensor;

a fourth actuator that moves the first bead sensor and the second bead sensor in the axial direction relative to one another;

a fifth actuator that moves the first sidewall/shoulder sensor and the second sidewall/shoulder sensor in the axial direction relative to one another; and a wheel post that has a pair of wheels that are configured for engaging an inner surface of the tire during measurements of the tire by the first bead sensor, the second bead sensor, the first sidewall/shoulder sensor, and the second sidewall/shoulder sensor;

wherein the wheel post is moved in the radial direction by the first actuator, and wherein the wheel post is not moved by the second actuator, the third actuator, the fourth actuator, or the fifth actuator.

12. The assembly as set forth in claim 1, wherein the first bead sensor, the second bead sensor, the first sidewall/shoulder sensor, and the second sidewall/shoulder sensor are configured for engaging an inner surface of the tire and for detecting cord damage inside of the tire.

* * * * *